US012755559B2

(12) United States Patent
Chen et al.

(10) Patent No.: US 12,755,559 B2
(45) Date of Patent: Oct. 6, 2026

(54) UNMANNED PARKING SPACE DETECTION METHOD BASED ON PANORAMIC SURROUND VIEW

(71) Applicant: EAST CHINA JIAOTONG UNIVERSITY, Nanchang (CN)

(72) Inventors: Qiping Chen, Nanchang (CN); Zhenghua Chen, Nanchang (CN); Dequan Zeng, Nanchang (CN); Qin Liu, Nanchang (CN); Chengping Zhong, Nanchang (CN); Xiaochun Zeng, Nanchang (CN); Xiaobo Zhang, Nanchang (CN); Hao Wu, Nanchang (CN); Yiming Hu, Nanchang (CN); Junling Ding, Nanchang (CN); Xuelan Yang, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 169 days.

(21) Appl. No.: 18/931,002

(22) Filed: Oct. 29, 2024

(65) Prior Publication Data

US 2025/0086983 A1 Mar. 13, 2025

Related U.S. Application Data

(63) Continuation of application No. PCT/CN2023/111468, filed on Aug. 7, 2023.

(30) Foreign Application Priority Data

May 9, 2023 (CN) ......................... 202310511825.9

(51) Int. Cl.
*G06V 20/58* (2022.01)
*G06V 10/75* (2022.01)
(Continued)

(52) U.S. Cl.
CPC .......... *G06V 20/586* (2022.01); *G06V 10/757* (2022.01); *G06V 10/806* (2022.01); *G06V 10/82* (2022.01)

(58) Field of Classification Search
CPC .... G06V 20/586; G06V 10/806; G06V 10/82; G06V 10/757
See application file for complete search history.

(56) References Cited

U.S. PATENT DOCUMENTS

2020/0020143 A1 * 1/2020 Yu .......................... B60K 35/28
2022/0343474 A1 * 10/2022 Zhang ....................... G06T 5/50

FOREIGN PATENT DOCUMENTS

CN 111369439 A * 7/2020 ............... G06T 7/80
CN 113191952 A 7/2021
(Continued)

OTHER PUBLICATIONS

Fu, Jun, Weisheng Li, Jiao Du, and Bin Xiao. "Multimodal medical image fusion via laplacian pyramid and convolutional neural network reconstruction with local gradient energy strategy." Computers in Biology and Medicine 126 (2020): 104048. (Year: 2020).*

*Primary Examiner* — David Perlman

(57) ABSTRACT

An unmanned parking space detection method based on a panoramic surround view is provided. The unmanned parking space detection method adopts a Laplace fusion algorithm to splice images to obtain the panoramic surround view, which effectively realize fusion of the images. By using an image quality evaluation function, complexity of the unmanned parking space detection method is reduced while ensuring a quality of the splicing. The panoramic surround view generated by the present disclosure has a more natural transition in the areas being spliced and fused, and the panoramic surround view display is more complete and beautiful. Compared with conventional machine vision detection technologies, the unmanned parking space detec-
(Continued)

tion method adopts a target detection technology for detecting parking space entrance lines and adopts a more lightweight network design to ensure real-time performance of a detection algorithm thereof, which has higher detection accuracy and stronger robustness.

7 Claims, 2 Drawing Sheets

(51) Int. Cl.
*G06V 10/80* (2022.01)
*G06V 10/82* (2022.01)

(56) References Cited

FOREIGN PATENT DOCUMENTS

| | | | |
|---|---|---|---|
| CN | 114283391 | A | 4/2022 |
| CN | 115376089 | A | 11/2022 |
| WO | 2015043507 | A1 | 4/2015 |
| WO | 2020056874 | A1 | 3/2020 |
| WO | 2023040068 | A1 | 3/2023 |

* cited by examiner

UNMANNED PARKING SPACE DETECTION METHOD BASED ON PANORAMIC SURROUND VIEW

TECHNICAL FIELD

The present disclosure relates to a technical field of intelligent vehicles, and in particular to an unmanned parking space detection method based on a panoramic surround view.

BACKGROUND

With development of automotive technology, more and more intelligent vehicles are equipped with advanced driver assistance systems. As one of core technologies of assisted driving, perception technology has become an important way for transition of the intelligent vehicles from assisted driving to unmanned driving.

Currently, gradual increase in the number of urban vehicles has brought challenges to urban transportation, making an urban traffic situation more and more harsh and complex. Since the number of urban parking spaces is difficult to keep up with a growth in the number of automobiles, tension in parking space resources is exacerbated. Parking space detection technology is a key technology used in an unmanned parking environment sensing system. An effect of parking space detection greatly affects safety and stability of a parking process. Through the parking space detection technology, a driverless vehicle is able to obtain information of surrounding parking spaces in real time according to parking space marking lines on a parking lot and accurately judge whether a parking space thereof is valid or not.

In prior art, the driverless vehicle mainly obtains information about a surrounding environment through a certain number of cameras and obtains parking space information based on machine vision detection technology. However, a method of fusing images captured by the cameras increases cost, the images are unable to be effectively fused in the prior art, and detection accuracy of an algorithm thereof is poor.

SUMMARY

An object of the present disclosure is to provide an unmanned parking space detection method based on a panoramic surround view to solve technical problems of high cost, ineffective fusion of images, and poor detection accuracy of the prior art.

The unmanned parking space detection method based on the panoramic surround view comprises:

- a step 1: respectively acquiring a front original image, a rear original image, a left original image, and a right original image of a surrounding environment of an automobile through a front-view camera, a rear-view camera, a left-view camera and a right-view camera arranged on the automobile;
- a step 2: respectively performing distortion removal processing and perspective transformation processing on the front original image, the rear original image, the left original image, and the right original image to obtain a front view, a rear view, a left view and a right view;
- a step 3: extracting feature points from the front view, the rear view, the left view and the right view by a random sample consensus (RANSAC) algorithm, and determining areas to be spliced and fused;
- a step 4: fusing the areas to be spliced and fused by a Laplace fusion algorithm to obtain the panoramic surround view, and in the fusion process, adjusting a quantity of layers of a Laplace pyramid according to an image quality evaluation function; and
- a step 5: inputting the panoramic surround view into a trained parking space detection model based on deep learning to obtain a parking space attribute result and a parking space identification point result.

The trained parking space detection model based on deep learning uses a repeated visual geometry group network (REP-VGG) network as a network trunk, and after the network trunk is output, the network trunk passes through a Sim-CSPSPPF module and residual convolution modules, branches of the network trunk pass through the residual convolution modules, and different parking space results are output on feature maps with different resolutions. The parking space attribute result is predicted by a first feature map with a lower resolution, and the parking space identification point result is predicted by a second feature map with a higher resolution.

The unmanned parking space detection method based on the panoramic surround view of the present disclosure has following characteristics.

The unmanned parking space detection method provided by the present disclosure only requires four cameras to complete tasks of image acquisition and splicing, and cost thereof is inexpensive.

The present disclosure adopts the Laplace fusion algorithm to splice the front view, the rear view, the left view, and the right view to obtain the panoramic surround view, which effectively realize fusion of the front view, the rear view, the left view, and the right view. By using the image quality evaluation function, complexity of the unmanned parking space detection method is reduced while ensuring a quality of the splicing. The panoramic surround view generated by the present disclosure has a more natural transition in the areas being spliced and fused, and the panoramic surround view display is more complete and beautiful.

Compared with conventional machine vision detection technologies, the unmanned parking space detection method based on the panoramic surround view of the present disclosure adopts a target detection technology for detecting parking space entrance lines, which has higher detection accuracy and stronger robustness. The present disclosure adopts a more lightweight network design to ensure real-time performance of a detection algorithm thereof.

The unmanned parking space detection method based on the panoramic surround view of the present disclosure does not rely on relative spatial locations of vehicles around a target parking space, but only requires a presence of the parking entrance lines on the ground in a parking area that meets parking standards to accomplish a parking space detection task.

The unmanned parking space detection method based on the panoramic surround view of the present disclosure is applicable to a wide range of parking environments, and is able to detect whether the target parking space is a vertical parking space, a parallel parking space, or an inclined parking space, and is able to obtain information about whether the target parking space is occupied.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
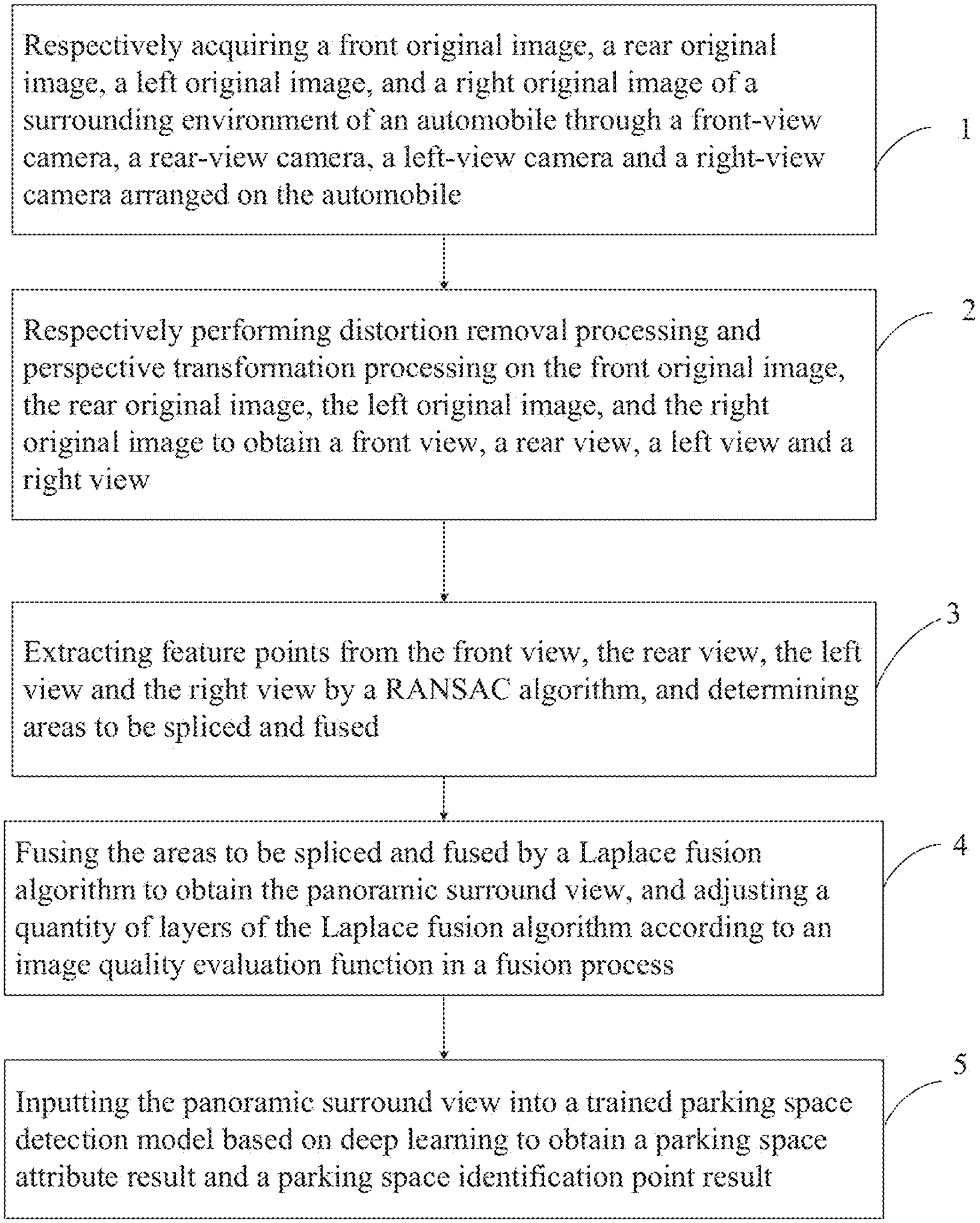
FIG. 1 is a flow chart of an unmanned parking space detection method based on a panoramic surround view of the present disclosure.

As shown in FIG. 1, an unmanned parking space detection method based on a panoramic surround view of the present disclosure comprises steps 1-5.

The step 1 comprises respectively acquiring a front original image, a rear original image, a left original image, and a right original image of a surrounding environment of an automobile through a front-view camera, a rear-view camera, a left-view camera and a right-view camera arranged on the automobile.

Figure 2:
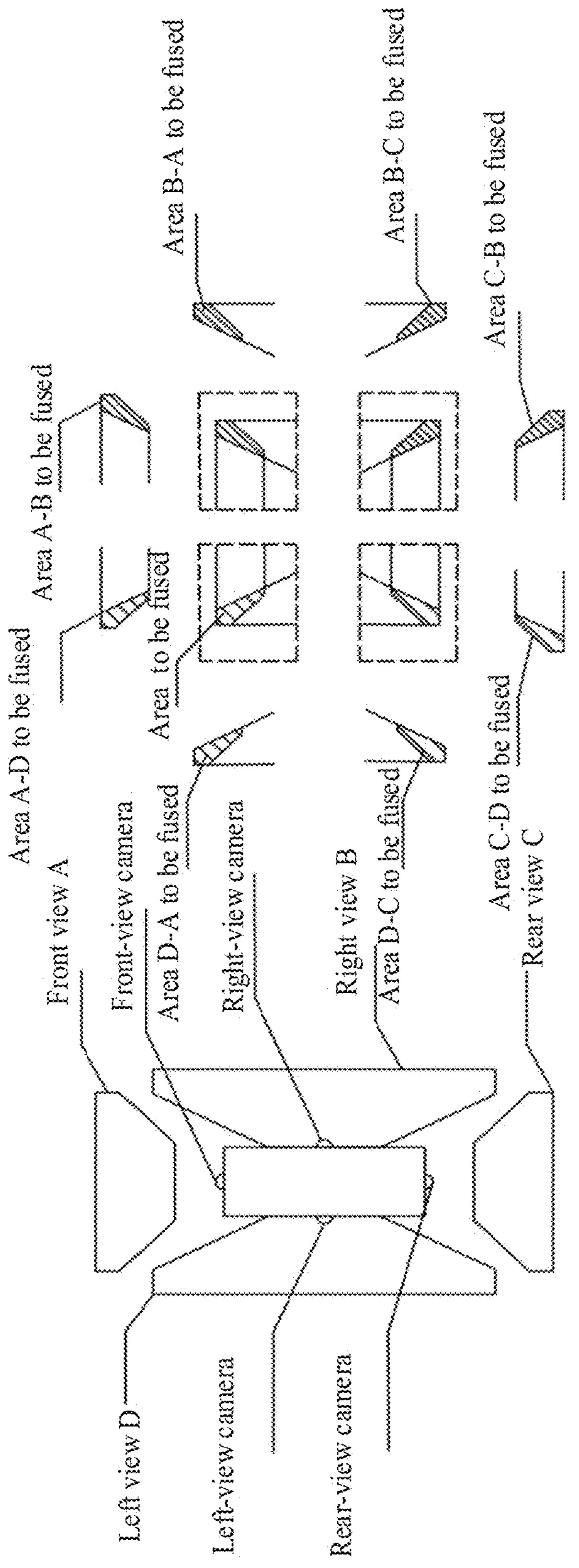
FIG. 2 is a schematic diagram showing mounting positions of cameras of the present disclosure.

In the embodiment, mounting positions of the front-view camera, the rear-view camera, the left-view camera, and the right-view camera are shown in FIG. 2, and the four cameras are fisheye cameras with a viewing angle of 190°, which enable a sensing range thereof to completely cover the surrounding environment of the automobile.

The step 2 comprises respectively performing distortion removal processing and perspective transformation processing on the front original image, the rear original image, the left original image, and the right original image to obtain a front view, a rear view, a left view and a right view.

In the embodiment, only radial distortions and tangential distortions of the fisheye cameras are considered.

The step 2 comprises steps 201-205.

The step 201 comprises converting physical coordinates in a world coordinate system to pixel coordinates in a pixel coordinate system by following formula:

$$Z\begin{pmatrix}u\\v\\1\end{pmatrix}=D\begin{pmatrix}f_x&0&C_x\\0&f_y&C_y\\0&0&1\end{pmatrix}\begin{pmatrix}R&T\\0&1\end{pmatrix}\begin{pmatrix}U\\V\\W\\1\end{pmatrix}=DAE\begin{pmatrix}U\\V\\W\\1\end{pmatrix}.$$

Z is a scale factor, D is a distortion matrix, R is a rotation matrix, T is a translation vector, A is an intrinsic parameter matrix, $$A=\begin{pmatrix}f_x&0&C_x\\0&f_y&C_y\\0&0&1\end{pmatrix},$$

E is an extrinsic parameter matrix, $$E=\begin{pmatrix}R&T\\0&1\end{pmatrix},\ (U,V,W)$$

is physical coordinates of a target point in the world coordinate system, (u, v) is pixel coordinates of the target point in the pixel coordinate system, the pixel coordinate system is ideal and undistorted, $f_x$ is a normalized focal length on an x-axis, $f_y$ is a normalized focal length on a y-axis, $f_x=f/dx$, $f_y=f/dy$, f represents a focal length of a corresponding camera, dx and dy are pixel units, and $(C_x, C_y)$ is an origin of a corresponding image.

The step 202 comprises fixing the world coordinate system on a checkerboard, so physical coordinates of any point W on the checkerboard is 0, and obtaining a plurality of (u, v), (U, V) by calibrating to obtain parameters of the intrinsic parameter matrix A.

The step 203 comprises obtaining an ideal matrix form of a conversion relationship between image coordinates and the pixel coordinates based on radial distortion formulas and tangential distortion formulas:

$$D_1\begin{bmatrix}k_1\\k_2\\k_3\end{bmatrix}D_2\begin{bmatrix}p_1\\p_2\end{bmatrix}=D\begin{bmatrix}k_1\\k_2\\k_3\end{bmatrix}\begin{bmatrix}p_1\\p_2\end{bmatrix}=\begin{bmatrix}\hat{u}-u\\\hat{v}-v\end{bmatrix}.$$

The radial distortion formulas are:

$$\hat{x}=x\left(1+k_1r^2+k_2r^4+k_3r^6\right),\text{ and}$$

$$\hat{y}=y\left(1+k_1r^2+k_2r^4+k_3r^6\right).$$

The tangential distortion formulas are:

$$\hat{x}=x+\left(2p_1y+p_2\left(r^2+2x^2\right)\right),\text{ and}$$

$$\hat{y}=y+\left(p_1\left(r^2+2y^2\right)+2p_2x\right).$$

$D_1$ and $D_2$ are intermediate values of the distortion matrix, (x, y) are ideal undistorted normalized image coordinates, $(\hat{x},\hat{y})$ are distorted normalized image coordinates, r is a distance from an image pixel to an image center, $r=\sqrt{x^2+y^2}$, $k_1$, $k_2$, $k_3$, $p_1$, $p_2$ are distortion parameters, $(\hat{u}, \hat{v})$ are distorted pixel coordinates, and the conversion relationship between the image coordinates and the pixel coordinates is $$\hat{u}=\frac{\hat{x}}{dx}+C_x\text{ and }\hat{v}=\frac{\hat{y}}{dy}+C_y.$$

The step 204 comprises determining $D_1$ and $D_2$ by obtaining the distortion parameters through offline calibration images, so as to determine the distortion matrix D, and respectively performing the distortion removal processing on the front original image, the rear original image, the left original image, and the right original image according to the distortion matrix to obtain a dedistorted front original image, a dedistorted rear original image, a dedistorted left original image, and a dedistorted right original image.

The step 205 comprises respectively performing the perspective transformation processing on the dedistorted front original image, the dedistorted rear original image, the dedistorted left original image, and the dedistorted right original image according to the extrinsic parameter matrix E obtained by extrinsic parameter calibration to obtain the front view, the rear view, the left view, and the right view.

As shown in FIG. 2, the step 2 is performed to obtain the front view A, the right view B, the rear view C, and the left view D.

The step 3 comprises extracting feature points from the front view, the rear view, the left view, and the right view by a random sample consensus (RANSAC) algorithm, and determining areas to be spliced and fused.

As shown in FIG. 2, a feature-based image splicing method is configured for the areas that need image registration, and the RANSAC algorithm is configured to extract the feature points to determine the areas A-B, B-A, B-C, C-B, C-D, D-C, D-A, and A-D that need to be spliced and fused.

The step 4 comprises fusing the areas to be spliced and fused by a Laplace fusion algorithm to obtain the panoramic surround view, and in the fusion process, adjusting a quantity of layers of a Laplace pyramid according to an image quality evaluation function.

In the step 4, fusing the areas to be spliced and fused by the Laplace fusion algorithm to obtain the panoramic surround view comprises steps 401*a*-406*a*.

The step 401*a* comprises performing Gaussian smoothing and down-sampling on a first image P1 in two images to be spliced and fused and performing Gaussian smoothing and up-sampling on the first image P1, and respectively repeating for N times to obtain an (N+1)-layer Gaussian pyramid of the first image P1, obtaining a first intermediate image $P_down_i$of an i-th layer of the (N+1)-layer Gaussian pyramid during an i-th Gaussian smoothing and down-sampling, obtaining a second intermediate image $P\_up_i$ of the i-th layer of the (N+1)-layer Gaussian pyramid during an i-th Gaussian smoothing and up-sampling.

i≤N and the (N+1)-layer Gaussian pyramid of the first image P1 comprises N second intermediate images $P\_up_i$ and the first image P1.

The step 402*a* comprises constructing the Laplace pyramid of the first image P1 by following formula:

$$\mathrm{P1\_L}_i = \mathrm{P\_down}_i - UP(\mathrm{P\_down}_{i+1}).$$

$\mathbf{P1\_L}_i$ represents a Laplacian residual image of an i-th layer of the Laplace pyramid of the first image P1, UP represent an up-sampling operation, N Laplacian residual images $\mathbf{P1\_L}_i$ constitute the Laplacian pyramid having N layers of the first image P1, and a third intermediate image $\mathbf{P1\_L}_{top}$ of the first image P1 is obtained by performing the Gaussian smoothing and down-sampling on a Laplacian residual image $\mathbf{P1\_L}_N$ of an N-th layer of the Laplace pyramid of the first image P1.

The step 403*a* comprises processing a second image P2 in the two images to be spliced and fused according to the steps 401*a*-402*a* to obtain a Laplace residual image $P2\_L_i$ of an i-th layer of the second image P2 and a Laplacian pyramid of the second image P2.

The Laplacian pyramid of the second image P2 has N+1 layers and comprises a third intermediate image $\mathbf{P2\_L}_{top}$ of the second image P2.

The step 404*a* comprises setting binary mask values of a mask matrix, where the mask matrix represents a weight ratio of the first image P1 that needs to be fused and a weight ratio of the second image P2 that needs to be fused, and performing down-sampling on the mask matrix for N times to obtain a down-sampled matrix $mask\_down_i$, so as to construct an (N+1)-layer Gaussian pyramid of the mask matrix, and performing image mask fusing on $\mathbf{P1\_L}_i$ and $\mathbf{P2\_L}_i$ to obtain $\mathbf{P12}_{fuse_i}$ according to the (N+1)-layer Gaussian pyramid of the mask matrix.

$\mathbf{P12}_{fuse_i}$ represents a mask fusion image of an i-th layer of the (N+1)-layer Gaussian pyramid of the mask matrix, and an expression thereof is:

$$P12_{fuse_i} = \mathrm{mask\_down}_i * \mathrm{P1\_L}_i + \mathrm{mask\_down}_i * \mathrm{P2\_L}_i.$$

* is an image layer fusion operator.

The step 405*a* comprises reconstructing $\mathbf{P12}_{fuse_i}$ by following formula to obtain a reconstructed fusion effect image $\mathbf{P12}_{construct_{i+1}}$ of the i-th layer of the (N+1)-layer Gaussian pyramid of the mask matrix:

$$P12_{construct_{i+1}} = \begin{cases} UP(P12_{fuse_i}) * P12_{fuse_{i+1}} & i = 0 \\ UP(P12_{construct_i}) * P12_{fuse_{i+1}} & i > 0 \end{cases}.$$

UP represents the up-sampling operation, $\mathbf{P12}_{construct_{i+1}}$ represents the reconstructed fusion effect image of the i-th layer of the (N+1)-layer Gaussian pyramid of the mask matrix, $\mathbf{P12}_{construct_i}$ represents a reconstructed fusion effect image of the (i−1)th layer of the (N+1)-layer Gaussian pyramid of the mask matrix, and * is an image layer fusion operator.

The step 406*a* comprises starting from i=0 to repeatedly execute the step 405*a* until i=N, constructing a reconstructed fusion effect image $\mathbf{P12}_{construct_{N+1}}$ of an N-th layer of the (N+1)-layer Gaussian pyramid of the mask matrix, and taking $\mathbf{P12}_{construct_{N+1}}$ as a final result of image fusion.

In the step 4, in the fusion process, adjusting the quantity of the layers of the Laplace fusion algorithm according to the image quality evaluation function; comprises steps 401*b*-402*b*.

The step 401*b* comprises performing an image splicing quality evaluation on the areas to be spliced and fused, and using a structural similarityinde (SSIM) evaluation method to evaluate an image splicing quality from three aspects of brightness, contrast, and structure similarity.

Expressions of an SSIM evaluation function are:

$$S(I_{ori}, I_{fuse}) = \left(l^{\alpha}(I_{ori}, I_{fuse}), c^{\beta}(I_{ori}, I_{fuse}), s^{\gamma}(I_{ori}, I_{fuse})\right);$$

$$l(I_{ori}, I_{fuse}) = \frac{2\mu_0\mu_f + c_1}{\mu_0^2 + \mu_f^2 + c_1};$$

$$c(I_{ori}, I_{fuse}) = \frac{2\sigma_o\sigma_f + c_2}{\sigma_o^2 + \sigma_f^2 + c_2}; \text{ and}$$

$$s(I_{ori}, I_{fuse}) = \frac{\sigma_{o-f} + c_3}{\sigma_o\sigma_f + c_3}.$$

$S(I_{ori}, I_{fuse})$ is an evaluation coefficient, $S(I_{ori}, I_{fuse}) \in (0, 1)$, $l^{\alpha}(I_{ori}, I_{fuse})$ represents brightness similarity, $C^{\beta}(I_{ori}, I_{fuse})$ represents contrast similarity, $s^{\gamma}(I_{ori}, I_{fuse})$ represents structural similarity, $I_{ori}$ represents an original image, $I_{fuse}$ represents an image to be evaluated, α, β, γ respectively represent a weighted contribution value on a score of the brightness similarity, a weighted contribution value on a score of the contrast similarity, and a weighted contribution value on a score of the structural similarity. $\mu_o$ represents an average intensity of the original image, $\mu_f$ represents an average intensity of the image to be evaluated, $\sigma_o$ represents a pixel standard deviation of the original image, $\sigma_f$ represents a pixel standard deviation of the image to be evaluated, $\sigma_{o\text{-}f}$ represents a mutual correlation coefficient between the original image and the image to be evaluated, and $C_1$, $C_2$, and $C_3$ are initial constants.

The step 402*b* comprises adjusting the quantity of the layers of the Laplace fusion algorithm according to an adjustment function A(N, S) based on the evaluation coefficient.

An expression of the adjustment function is:

$$A(N,S)=20e(S-1)^4+10(S-1)^2+1.$$

e is a constant, S is an adjustable parameter, and S∈(0, 1).

The areas A-B, B-A, B-C, C-B, C-D, D-C, D-A, and A-D that need to be spliced and fused are respectively input as the first image P1 and the second image P2 of the Laplace fusion algorithm. Then above operations are performed to obtain four smooth fused images of an upper left smooth fused image, an upper right smooth fused image, a lower right smooth fused image, and a lower left smooth fused image, and the four smooth fused images are spliced with other areas that do not need to be fused to obtain the panoramic surround view that is complete, smooth, and clear.

The step 5 comprises inputting the panoramic surround view into a trained parking space detection model based on deep learning to obtain a parking space attribute result and a parking space identification point result.

The trained parking space detection model uses a repeated visual geometry group network (REP-VGG) network as a network trunk. After the network trunk is output, the network trunk passes through a Sim-CSPSPPF module and residual convolution modules, branches of the network trunk pass through the residual convolution modules, and different parking space results are output on feature maps with different resolutions. The parking space attribute result is predicted by a first feature map with a lower resolution, and the parking space identification point result is predicted by a second feature map with a higher resolution.

The step 5 comprises steps 501-503.

The step 501 comprises providing a total loss function for the trained parking space detection model based on deep learning.

An expression of the total Loss function Loss is:

$$\text{Loss}=\lambda_{PKL}\cdot L_{PKL}+\lambda_{MP}\cdot L_{MP}.$$

$\lambda_{PKL}$ is a weight hyperparameter of a parking space loss function $L_{PKL}$, $\lambda_{MP}$ is a weight hyperparameter of a parking space identification point loss function $L_{MP}$, the parking space loss function $L_{PKL}$ is designed on the first feature map with the lower resolution, and the parking space identification point loss function $L_{MP}$ is designed on the second feature map with the higher resolution.

The step 502 comprises setting an initial learning rate to 0.001, selecting AdamW as a gradient descent optimizer, setting BATCH to be 32, setting a quantity of iterations to be 200, and obtaining the trained parking space detection model based on deep learning when a value of the total loss function Loss converges.

The step 503 comprises inputting the panoramic surround view into the trained parking space detection model based on deep learning to obtain information of two parking space identification points of a parking space entrance line, combining the parking space attribute result and the parking space identification point result to obtain coordinate information M1 and M2 of the two parking space identification points of the parking space entrance line, and obtaining coordinate information M3 and M4 of another two parking space identification points of a target parking space that do not appear in the panoramic surround view by parking space identification point derivation expressions.

The parking space identification point derivation expressions are:

$$M3=\begin{bmatrix}\cos\alpha_n & \sin\alpha_n\\ -\sin\alpha_n & \cos\alpha_n\end{bmatrix}\frac{\overrightarrow{M1M2}}{\|\overrightarrow{M1M2}\|}L_n+M2,$$

and $$M4=\begin{bmatrix}\cos\alpha_n & \sin\alpha_n\\ -\sin\alpha_n & \cos\alpha_n\end{bmatrix}\frac{\overrightarrow{M1M2}}{\|\overrightarrow{M1M2}\|}L_n+M1.$$

$\alpha_n$ represents an angle of an n-th parking space in the panoramic surround view, and $L_n$ represents a depth of the n-th parking space in the panoramic surround view.

An expression of the parking space loss function $L_{PKL}$ is:

$$L_{PKL}=W_T\cdot L_T+W_O\cdot L_O+W_C\cdot L_C.$$

$W_T$ represents a weight hyperparameter of a parking space category loss function $L_T$, $W_O$ represents a weight hyperparameter corresponding to a parking space occupancy loss function $L_o$, and $W_C$ represents a weight hyperparameter corresponding to a parking location confidence loss function $L_C$.

Expressions of the parking space category loss function $L_T$ are:

$$L_T=\sum_{g=1}^{w1\cdot h1}P_T^i\cdot-\frac{1}{3}\sum_{t=1}^{3}[y_t\cdot\log(\sigma(x_t))+(1-y_t)\cdot\log(1-\sigma(x_t))],$$

and $$\sigma(x_t)=\frac{1}{1+\exp(-x_t)}.$$

w1 represents a width of the first feature map, h1 represents a height of the first feature map, $$P_T^i$$

determines whether a center of a g-th grid belongs to a parking space area, $$P_T^i=1$$

represents that the center of the g-th grid belongs to the parking space area, and $$P_T^i=0$$

represents that the center of the g-th grid does not belong to the parking space area. $x_t$ represents a probability that a predicted parking space is a t-th type parking space. $y_t$ represents a true value that the predicted parking space belongs to the t-th type parking space, $y_t$=(0, 0, 1) represents that the predicted parking space is a vertical parking space, $y_t$=(0, 1, 0) represents that the predicted parking space is a parallel parking space, $y_t$=(1, 0, 0) represents that the predicted parking space is an inclined parking space, and $\sigma(x_t)$ is an intermediate function.

An expression of the parking space occupancy loss function $L_O$ is:

$$L_O = \sum_{g=1}^{w1\cdot h1}\left[\alpha \cdot P_A^g\left(S_{o_x}^g - S_{o_y}^g\right)^2 + P_{IN}^g\left(S_{o_x}^g - S_{o_y}^g\right)^2\right].$$

$\alpha$ is a weight value for balancing valid parking spaces and invalid parking spaces, $$P_A^g$$

determines whether the center of the g-th grid is within a valid parking space area, $$P_A^g = 1$$

represents that the center of the g-th grid is within the valid parking space area, and $$P_A^g = 0$$

represents that the center of the g-th grid is located in a non-valid parking space area.

$$P_{IN}^g$$

determines whether the g-th grid is located in an invalid parking space area, $$P_{IN}^g = 1 = 1$$

represents that the center of the g-th grid is located in the invalid parking space area, and $$P_{IN}^g = 0$$

indicates that the center of the g-th grid is located in a non-invalid parking space area.

$$S_{o_x}^g$$

represents a probability of whether the predicted parking space on the g-th grid is valid, $$S_{o_y}^g$$

represents a true value of whether the predicted parking space on the g-th grid is valid, $$S_{o_y}^g = 0$$

represents that the predicted parking space is a valid parking space, and $$S_{o_y}^g = 1$$

represents that the predicted parking space is an invalid parking space.

An expression of the parking location confidence loss function $L_C$ is:

$$L_C = \sum_{g=1}^{w1\cdot h1}\left[P_C^g \cdot \left(C_x^g - C_y^g\right)^2 + \alpha_P\left(1 - P_C^g\right)\left(C_x^g - C_y^g\right)^2\right].$$

$$P_C^g$$

determines whether the center of the g-th grid belongs to the parking space area, $$P_C^g = 1$$

represents that the center of the g-th grid belongs to the parking space area, and $$P_C^g = 0$$

represents that the center of the g-th grid does not belong to the parking space area.

$$C_x^g$$

represents a predicted probability value that the g-th grid belongs to the parking space.

$$C_y^g$$

represents a true value that the g-th grid belongs to the parking space, and $\alpha_p$ is a weight value for balancing the parking space area and a non-parking space area.

An expression of the parking space identification point loss function $L_{MP}$ is:

$$L_{MP} = W_{M_{xy}} \cdot L_{M_{xy}} + W_\theta \cdot L_\theta.$$

$W_{M_{xy}}$ represents a weight hyperparameter corresponding to a parking space identification point coordinate loss function $L_{M_{xy}}$, and $W_\theta$ represents a weight hyperparameter corresponding to a parking space identification point angle orientation loss function $L_\theta$.

An expression of the parking space identification point coordinate loss function $L_{M_{xy}}$ is:

$$L_{M_{xy}} = \sum_{g=1}^{w2 \cdot h2} P_{M_{xy}}^g \cdot \left[\left(X_x^g - \frac{X_y^g}{w2}\right)^2 + \left(Y_x^g - \frac{Y_y^g}{h2}\right)^2\right].$$

w2 represents a width of the second feature map, h2 represents a height of the second feature map, $$P_{M_{xy}}^g$$

determines whether a g-th grid contains one of the parking space identification points, $$P_{M_{xy}}^g = 1$$

represents that the g-th grid contains the one of the parking space identification points, and $$P_{M_{xy}}^g = 0$$

represents that the g-th grid does not contain the one of the parking space identification points.

$$X_x^g$$

represents a predicted value of the one of the parking space identification points in an x-coordinate direction of the g-th grid, $$X_y^g$$

represents a true value of the one of the parking space identification points in the x-coordinate direction of the g-th grid.

$$Y_x^g$$

represents a predicted value of the one of the parking space identification points in a y-coordinate direction of the g-th grid, and $$Y_y^g$$

represents a true value of the one of the parking space identification points in the y-coordinate direction of the g-th grid.

An expression of the parking space identification point angle orientation loss function $L_\theta$ is:

$$L_\theta = \sum_{g=1}^{w2 \cdot h2} P_{M_{xy}}^g \cdot \left[\left(\cos\theta_x^g - \cos\theta_y^g\right)^2 + \left(\sin\theta_x^g - \sin\theta_y^g\right)^2\right].$$

$$\cos\theta_x^g$$

represents a predicted cosine value of an angle orientation of the one of the parking space identification points on the g-th grid, $$\cos\theta_y^g$$

represents a true cosine value of the angle orientation of the one of the parking space identification points on the g-th grid.

$$\sin\theta_x^g$$

represents a predicted sine value of the angle orientation of the one of the parking space identification points on the g-th grid, and $$\sin\theta_y^g$$

represents a true sine value of the angle orientation of the one of the parking space identification points on the g-th grid.

Finally, by combining information of the four parking space identification points of each of the parking spaces in the panoramic surround view and the parking space attribute information, detailed information of all of the parking spaces around the automobile is obtained in real time, and the detailed information of all of the parking spaces is transmitted to a next level of autonomous driving path planning module and a decision-making control module to realize an automatic parking function of the automobile.

In summary, the unmanned parking space detection method based on the panoramic surround view of the present disclosure has following characteristics.

The unmanned parking space detection method provided by the present disclosure only requires four cameras to complete tasks of image acquisition and splicing, and cost thereof is inexpensive.

The present disclosure adopts the Laplace fusion algorithm to splice the front view, the rear view, the left view, and the right view to obtain the panoramic surround view, which effectively realize fusion of the front view, the rear view, the left view, and the right view. By using the image quality evaluation function, complexity of the unmanned parking space detection method is reduced while ensuring a quality of the splicing. The panoramic surround view generated by the present disclosure has a more natural transition in the areas being spliced and fused, and the panoramic surround view display is more complete and beautiful.

Compared with conventional machine vision detection technologies, the unmanned parking space detection method based on the panoramic surround view of the present disclosure adopts a target detection technology for detecting parking space entrance lines, which has higher detection accuracy and stronger robustness. The present disclosure adopts a more lightweight network design to ensure real-time performance of a detection algorithm thereof.

The unmanned parking space detection method based on the panoramic surround view of the present disclosure does not rely on relative spatial locations of vehicles around a target parking space, but only requires a presence of the parking entrance lines on the ground in a parking area that meets parking standards to accomplish a parking space detection task.

The unmanned parking space detection method based on the panoramic surround view of the present disclosure is applicable to a wide range of parking environments, and is able to detect whether the target parking space is a vertical parking space, a parallel parking space, or an inclined parking space, and is able to obtain information about whether the target parking space is occupied.

In the description of the present disclosure, the description of reference terms "one embodiment", "some embodiments", "examples", "particular examples", "some examples", etc. mean that particular features, structures, materials, or characteristics described in connection with the embodiments or examples are included in at least one embodiment or example of the present disclosure. In the specification, schematic representations of the above terms do not necessarily refer to the same embodiment or example. Furthermore, the specific features, structures, materials or characteristics described may be combined in any suitable manner in any one or more embodiments or examples.

Although the embodiments of the present disclosure have been shown and described, those of ordinary skill in the art can understand that various changes, modifications, substitutions, and variations can be made to these embodiments without departing from the principle and spirit of the present disclosure. The scope of the present disclosure is defined by the appended claims and their equivalents.

What is claimed is:

1. An unmanned parking space detection method based on a panoramic surround view, comprising:

a step 1: respectively acquiring a front original image, a rear original image, a left original image, and a right original image of a surrounding environment of an automobile through a front-view camera, a rear-view camera, a left-view camera and a right-view camera arranged on the automobile;

a step 2: respectively performing distortion removal processing and perspective transformation processing on the front original image, the rear original image, the left original image, and the right original image to obtain a front view, a rear view, a left view, and a right view;

a step 3: extracting feature points from the front view, the rear view, the left view and the right view by a random sample consensus (RANSAC) algorithm, and determining areas to be spliced and fused;

a step 4: fusing the areas to be spliced and fused by a Laplace fusion algorithm to obtain the panoramic surround view, and adjusting a quantity of layers of a Laplace pyramid according to an image quality evaluation function in a fusion process; and a step 5: inputting the panoramic surround view into a trained parking space detection model based on deep learning to obtain a parking space attribute result and a parking space identification point result;

wherein the trained parking space detection model based on deep learning uses a repeated visual geometry group network (REP-VGG) network as a network trunk, and after the network trunk is output, the network trunk passes through a Sim-CSPSPPF module and residual convolution modules, branches of the network trunk pass through the residual convolution modules, and different parking space results are output on feature maps with different resolutions; the parking space attribute result is predicted by a first feature map with a lower resolution, and the parking space identification point result is predicted by a second feature map with a higher resolution.

2. The unmanned parking space detection method based on the panoramic surround view according to claim 1, wherein the step 2 comprises:

a step 201: converting physical coordinates in a world coordinate system to pixel coordinates in a pixel coordinate system by following formula:

$$Z\begin{pmatrix} u \\ v \\ 1 \end{pmatrix} = D\begin{pmatrix} f_x & 0 & C_x \\ 0 & f_y & C_y \\ 0 & 0 & 1 \end{pmatrix}\begin{pmatrix} R & T \\ 0 & 1 \end{pmatrix}\begin{pmatrix} U \\ V \\ W \\ 1 \end{pmatrix} = DAE\begin{pmatrix} U \\ V \\ W \\ 1 \end{pmatrix};$$

wherein Z is a scale factor, D is a distortion matrix, R is a rotation matrix, T is a translation vector, A is an intrinsic parameter matrix, $$A = \begin{pmatrix} f_x & 0 & C_x \\ 0 & f_y & C_y \\ 0 & 0 & 1 \end{pmatrix}, E$$

is an extrinsic parameter matrix, $$E = \begin{pmatrix} R & T \\ 0 & 1 \end{pmatrix}, (U, V, W)$$

is physical coordinates of a target point in the world coordinate system, (u, v) is pixel coordinates of the target point in the pixel coordinate system, the pixel coordinate system is ideal and undistorted, $f_x$ is a normalized focal length on an x-axis, $f_y$ is a normalized focal length on a y-axis, $f_x$=f/dx, $f_y$=f/dy, f represents a focal length of a corresponding camera, dx and dy are pixel units, and ($C_x$, $C_y$) is an origin of a corresponding image;

a step 202, fixing the world coordinate system on a checkerboard, so physical coordinates of any point W on the checkerboard is 0, and obtaining a plurality of (u, v), (U, V) by calibrating to obtain parameters of the intrinsic parameter matrix A;

a step 203, obtaining an ideal matrix form of a conversion relationship between image coordinates and the pixel coordinates based on radial distortion formulas and tangential distortion formulas:

$$D_1\begin{bmatrix} k_1 \\ k_2 \\ k_3 \end{bmatrix} D_2\begin{bmatrix} p_1 \\ p_2 \end{bmatrix} = D\begin{bmatrix} k_1 \\ k_2 \\ k_3 \end{bmatrix}\begin{bmatrix} p_1 \\ p_2 \end{bmatrix} = \begin{bmatrix} \hat{u} - u \\ \hat{v} - v \end{bmatrix};$$

where the radial distortion formulas are:

$$\hat{x} = x(1 + k_1 r^2 + k_2 r^4 + k_3 r^6),$$

and $$\hat{y} = y(1 + k_1 r^2 + k_2 r^4 + k_3 r^6);$$

where the tangential distortion formulas are:

$$\hat{x} = x + (2p_1 y + p_2(r^2 + 2x^2)),$$

and $$\hat{y} = y + (p_1(r^2 + 2y^2) + 2p_2 x);$$

wherein $D_1$ and $D_2$ are intermediate values of the distortion matrix, (x, y) are ideal undistorted normalized image coordinates, $(\hat{x},\hat{y})$ are distorted normalized image coordinates; r is a distance from an image pixel to an image center, $r=\sqrt{x^2+y^2}$, $k_1$, $k_2$, $k_3$, $p_1$, $p_2$ are distortion parameters, $(\hat{u}, \hat{v})$ are distorted pixel coordinates, the conversion relationship between the image coordinates and the pixel coordinates is $$\hat{u} = \frac{\hat{x}}{dx} + C_x,$$

$$\hat{v} = \frac{\hat{y}}{dy} + C_y;$$

a step 204: determining $D_1$ and $D_2$ by obtaining the distortion parameters through offline calibration images, so as to determine the distortion matrix D, and respectively performing the distortion removal processing on the front original image, the rear original image, the left original image, and the right original image according to the distortion matrix to obtain a dedistorted front original image, a dedistorted rear original image, a dedistorted left original image, and a dedistorted right original image; and a step 205, respectively performing the perspective transformation processing on the dedistorted front original image, the dedistorted rear original image, the dedistorted left original image, and the dedistorted right original image according to the extrinsic parameter matrix E obtained by extrinsic parameter calibration to obtain the front view, the rear view, the left view, and the right view.

3. The unmanned parking space detection method based on the panoramic surround view according to claim 1, wherein in the step 4, fusing the areas to be spliced and fused by the Laplace fusion algorithm to obtain the panoramic surround view comprises:

a step 401*a*: performing Gaussian smoothing and down-sampling on a first image P1 in two images to be spliced and fused and performing Gaussian smoothing and up-sampling on the first image P1, and respectively repeating for N times to obtain an (N+1)-layer Gaussian pyramid of the first image P1, obtaining a first intermediate image P_downi of an i-th layer of the (N+1)-layer Gaussian pyramid during an i-th Gaussian smoothing and down-sampling, obtaining a second intermediate image P_upi of the i-th layer of the (N+1)-layer Gaussian pyramid during an i-th Gaussian smoothing and up-sampling, i≤N, and the (N+1)-layer Gaussian pyramid of the first image P1 comprises N second intermediate images P_upiand the first image P1;

a step 402*a*: constructing the Laplace pyramid of the first image P1 by following formula:

$$\text{P1\_L}_i = \text{P\_down}_i - UP(\text{P\_down}_{i+1});$$

wherein P1_Li represents a Laplacian residual image of an i-th layer of the Laplace pyramid of the first image P1, UP represent an up-sampling operation, N Laplacian residual images P1_Li constitute the Laplacian pyramid having N layers of the first image P1, and a third intermediate image P1_Ltop of the first image P1 is obtained by performing the Gaussian smoothing and down-sampling on a Laplacian residual image P1_LN of an N-th layer of the Laplace pyramid of the first image P1;

a step 403*a*: processing a second image P2 in the two images to be spliced and fused according to the steps 401*a*-402*a* to obtain a Laplace residual image P2_Li of an i-th layer of the second image P2 and a Laplacian pyramid of the second image P2; where the Laplacian pyramid of the second image P2 has N+1 layers and comprises a third intermediate image P2_Ltop of the second image P2;

a step 404*a*: setting binary mask values of a mask matrix, where the mask matrix represents a weight ratio of the first image P1 that needs to be fused and a weight ratio of the second image P2 that needs to be fused, and performing down-sampling on the mask matrix for N times to obtain a down-sampled matrix mask_downi, so as to construct an (N+1)-layer Gaussian pyramid of the mask matrix, and performing image mask fusing on P1_Li and P2_Li to obtain P12fusei according to the (N+1)-layer Gaussian pyramid of the mask matrix; P12fusei represents a mask fusion image of an i-th layer of the (N+1)-layer Gaussian pyramid of the mask matrix, an expression thereof is:

$$P12_{fuse_i} = \text{mask\_down}_i * \text{P1\_L}_i + \text{mask\_down}_i * \text{P2\_L}_i;$$

wherein * is an image layer fusion operator;

a step 405*a*: reconstructing P12fusei by following formula to obtain a reconstructed fusion effect image P12constructi+1 of the i-th layer of the (N+1)-layer Gaussian pyramid of the mask matrix:

$$P12_{construct_{i+1}} = \begin{cases} UP(P12_{fuse_i}) * P12_{fuse_{i+1}} & i = 0 \\ UP(P12_{construct_i}) * P12_{fuse_{i+1}} & i > 0 \end{cases};$$

wherein P12constructi+1 represents the reconstructed fusion effect image of the i-th layer of the (N+1)-layer Gaussian pyramid of the mask matrix, and P12constructi represents a reconstructed fusion effect image of an (i−1)th layer of the (N+1)-layer Gaussian pyramid of the mask matrix; and a step 406*a*: starting from i=0 to repeatedly execute the step 405*a* until i=N; constructing a reconstructed fusion effect image P12constructN+1 of an N-th layer of the (N+1)-layer Gaussian pyramid of the mask matrix, and taking P12constructN+1 as a final result of image fusion.

4. The unmanned parking space detection method based on the panoramic surround view according to claim 3, wherein in the step 4, in the fusion process, adjusting the quantity of the layers of the Laplace fusion algorithm according to the image quality evaluation function; comprises:

a step 401*b*: performing an image splicing quality evaluation on the areas to be spliced and fused, and using a structural similarityinde (SSIM) evaluation method to evaluate an image splicing quality from three aspects of brightness, contrast, and structure similarity, and expressions of an SSIM evaluation function are:

$$S(I_{ori}, I_{fuse}) = \left(l^{\alpha}(I_{ori}, I_{fuse}), c^{\beta}(I_{ori}, I_{fuse}), s^{\gamma}(I_{ori}, I_{fuse})\right),$$

$$l(I_{ori}, I_{fuse}) = \frac{2\mu_o\mu_f + C_1}{\mu_o^2 + \mu_f^2 + C_1},$$

$$c(I_{ori}, I_{fuse}) = \frac{2\sigma_o\sigma_f + C_2}{\sigma_o^2 + \sigma_f^2 + C_2},$$

and $$s(I_{ori}, I_{fuse}) = \frac{\sigma_{o-f} + C_3}{\sigma_o\sigma_f + C_3};$$

wherein $S(I_{ori},I_{fuse})$ is an evaluation coefficient, $S(I_{ori}, I_{fuse}) \in (0, 1)$, $l^{\alpha}(I_{ori},I_{fuse})$ represents brightness similarity, $c^{\beta}(I_{ori},I_{fuse})$ represents contrast similarity, $s^{\gamma}(I_{ori}, I_{fuse})$ represents structural similarity, $I_{ori}$ represents an original image, $I_{fuse}$ represents an image to be evaluated, α, β, γ respectively represent a weighted contribution value on a score of the brightness similarity, a weighted contribution value on a score of the contrast similarity, and a weighted contribution value on a score of the structural similarity; $\mu_o$ represents an average intensity of the original image, $\mu_f$ represents an average intensity of the image to be evaluated, $\sigma_o$ represents a pixel standard deviation of the original image, $\sigma_f$ represents a pixel standard deviation of the image to be evaluated, $\sigma_{o-f}$ represents a mutual correlation coefficient between the original image and the image to be evaluated, and $C_1$, $C_2$, and $C_3$ are initial constants; and a step 402*b*: adjusting the quantity of the layers of the Laplace fusion algorithm according to an adjustment function A(N, S) based on the evaluation coefficient, and an expression of the adjustment function is:

$$A(N, S) = 20\,e\,(S-1)^4 + 10\,(s-1)^2 + 1;$$

wherein e is a constant, S is an adjustable parameter, and $S \in (0, 1)$.

5. The unmanned parking space detection method based on the panoramic surround view according to claim 1, wherein the step 5 comprises:

a step 501: providing a total loss function for the trained parking space detection model based on deep learning, where an expression of the total loss function Loss is:

$$\text{Loss} = \lambda_{PKL} \cdot L_{PKL} + \lambda_{MP} \cdot L_{MP},$$

wherein $\lambda_{PKL}$ is a weight hyperparameter of a parking space loss function $L_{PKL}$, $\lambda_{MP}$ is a weight hyperparameter of a parking space identification point loss function $L_{Mp}$, the parking space loss function $L_{PKL}$ is designed on the first feature map with the lower resolution, and the parking space identification point loss function $L_{MP}$ is designed on the second feature map with the higher resolution;

a step 502: setting an initial learning rate to 0.001, selecting AdamW as a gradient descent optimizer, setting BATCH to be 32, setting a quantity of iterations to be 200, and obtaining the trained parking space detection model based on deep learning when a value of the total loss function Loss converges; and a step 503: inputting the panoramic surround view into the trained parking space detection model based on deep learning to obtain information of two parking space identification points of a parking space entrance line, combining the parking space attribute result and the parking space identification point result to obtain coordinate information M1 and M2 of the two parking space identification points of the parking space entrance line, obtaining coordinate information M3 and M4 of another two parking space identification points of a target parking space that do not appear in the panoramic surround view by parking space identification point derivation expressions, where the parking space identification point derivation expressions are:

$$M3 = \begin{bmatrix} \cos\alpha_n & \sin\alpha_n \\ -\sin\alpha_n & \cos\alpha_n \end{bmatrix} \frac{\overrightarrow{M1M2}}{\|\overrightarrow{M1M2}\|} L_n + M2,$$

$$M4 = \begin{bmatrix} \cos\alpha_n & \sin\alpha_n \\ -\sin\alpha_n & \cos\alpha_n \end{bmatrix} \frac{\overrightarrow{M1M2}}{\|\overrightarrow{M1M2}\|} L_n + M1,$$

wherein $\alpha_n$ represents an angle of an n-th parking space in the panoramic surround view, and $L_n$ represents a depth of the n-th parking space in the panoramic surround view.

6. The unmanned parking space detection method based on the panoramic surround view according to claim 5, wherein an expression of the parking space loss function $L_{PKL}$ is:

$$L_{PKL} = W_T \cdot L_T + W_O \cdot L_O + W_C \cdot L_C,$$

wherein $W_T$ represents a weight hyperparameter of a parking space category loss function $L_T$, $W_O$ represents a weight hyperparameter corresponding to a parking space occupancy loss function $L_O$, and $W_C$ represents a weight hyperparameter corresponding to a parking location confidence loss function $L_C$;

wherein expressions of the parking space category loss function $L_T$ are:

$$L_T = \sum_{g=1}^{w1\cdot h1} P_T^i \cdot -\frac{1}{3}\sum_{t=1}^{3} [y_t \cdot \log(\sigma(x_t)) + (1-y_t)\cdot\log(1-\sigma(x_t))],$$

$$\sigma(x_t) = \frac{1}{1+\exp(-x_t)},$$

wherein w1 represents a width of the first feature map, h1 represents a height of the first feature map, $$P_T^i$$

determines whether a center of a g-th grid belongs to a parking space area, $$P_T^i = 1$$

represents that the center of the g-th grid belongs to the parking space area, and $$P_T^i = 0$$

represents that the center of the g-th grid does not belong to the parking space area; $x_t$ represents a probability that a predicted parking space is a t-th type parking space; $y_t$ represents a true value that the predicted parking space belongs to the t-th type parking space, $y_t$=(0, 0, 1) represents that the predicted parking space is a vertical parking space, $y_t$=(0, 1, 0) represents that the predicted parking space is a parallel parking space, $y_t$=(1, 0, 0) represents that the predicted parking space is an inclined parking space, and $\sigma(x_t)$ is an intermediate function;

wherein an expression of the parking space occupancy loss function $L_O$ is:

$$L_O = \sum_{g=1}^{w1\cdot h1} \left[\alpha \cdot P_A^g \left(S_{o_x}^g - S_{o_y}^g\right)^2 + P_{IN}^g \left(S_{o_x}^g - S_{o_y}^g\right)^2\right],$$

wherein α is a weight value for balancing valid parking spaces and invalid parking spaces, $$P_A^g$$

determines whether the center of the g-th grid is within a valid parking space area, $$P_A^g = 1$$

represents that the center of the g-th grid is within the valid parking space area, and $$P_A^g = 0$$

represents that the center of the g-th grid is located in a non-valid parking space area;

$$P_{IN}^g$$

determines whether the g-th grid is located in an invalid parking space area, $$P_{IN}^g = 1 = 1$$

represents that the center of the g-th grid is located in the invalid parking space area, and $$P_{IN}^g = 0$$

indicates that the center of the g-th grid is located in a non-invalid parking space area;

$$S_{o_x}^g$$

represents a probability of whether the predicted parking space on the g-th grid is valid, $$S_{o_y}^g$$

represents a true value of whether the predicted parking space on the g-th grid is valid, $$S_{o_y}^g = 0$$

represents that the predicted parking space is a valid parking space, and $$S_{o_y}^g = 1$$

represents that the predicted parking space is an invalid parking space;

wherein an expression of the parking location confidence loss function $L_C$ is:

$$L_C = \sum_{g=1}^{w1\cdot h1} \left[P_C^g \cdot \left(C_x^g - C_y^g\right)^2 + \alpha_P \left(1 - P_C^g\right)\left(C_x^g - C_y^g\right)^2\right],$$

wherein $$P_C^g$$

determines whether the center of the g-th grid belongs to the parking space area, $$P_C^g = 1$$

represents that the center of the g-th grid belongs to the parking space area, and $$P_C^g = 0$$

irepresents that the center of the g-th grid does not belong to the parking space area;

$$C_x^g$$

represents a predicted probability value that the g-th grid belongs to the parking space, $$C_y^g$$

represents a true value that the g-th grid belongs to the parking space, and $\alpha_P$ is a weight value for balancing the parking space area and a non-parking space area.

7. The unmanned parking space detection method based on the panoramic surround view according to claim 5, wherein an expression of the parking space identification point loss function $L_{MP}$ is:

$$L_{MP} = W_{M_{xy}} \cdot L_{M_{xy}} + W_\theta \cdot L_\theta,$$

wherein $W_{M_{xy}}$ represents a weight hyperparameter corresponding to a parking space identification point coordinate loss function $L_{M_{xy}}$, and $W_\theta$ represents a weight hyperparameter corresponding to a parking space identification point angle orientation loss function $L_\theta$;

wherein an expression of the parking space identification point coordinate loss function $L_{M_{xy}}$ is:

$$L_{M_{xy}} = \sum_{g=1}^{w2 \cdot h2} P_{M_{xy}}^g \cdot \left[\left(X_x^g - \frac{X_y^g}{w2}\right)^2 + \left(Y_x^g - \frac{Y_y^g}{h2}\right)^2\right],$$

wherein w2 represents a width of the second feature map, h2 represents a height of the second feature map, $$P_{M_{xy}}^g$$

determines whether a g-th grid contains one of the parking space identification points, $$P_{M_{xy}}^g = 1$$

represents that the g-th grid contains the one of the parking space identification points, and $$P_{M_{xy}}^g = 0$$

represents that the g-th grid does not contain the one of the parking space identification points;

$$X_x^g$$

represents a predicted value of the one of the parking space identification points in an x-coordinate direction of the g-th grid, $$X_y^g$$

represents a true value of the one of the parking space identification points in the x-coordinate direction of the g-th grid;

$$Y_x^g$$

represents a predicted value of the one of the parking space identification points in a y-coordinate direction of the g-th grid, and $$Y_y^g$$

represents a true value of the one of the parking space identification points in the y-coordinate direction of the g-th grid;

wherein an expression of the parking space identification point angle orientation loss function $L_\theta$ is:

$$L_\theta = \sum_{g=1}^{w2 \cdot h2} P_{M_{xy}}^g \cdot \left[\left(\cos\theta_x^g - \cos\theta_y^g\right)^2 + \left(\sin\theta_x^g - \sin\theta_y^g\right)^2\right],$$

wherein $$\cos\theta_x^g$$

represents a predicted cosine value of an angle orientation of the one of the parking space identification points on the g-th grid, $$\cos\theta_y^g$$

represents a true cosine value of the angle orientation of the one of the parking space identification points on the g-th grid;

$$\sin\theta_x^g$$

represents a predicted sine value of the angle orientation of the one of the parking space identification points on the g-th grid, and $$\sin\theta_y^g$$

represents a true sine value of the angle orientation of the one of the parking space identification points on the g-th grid.

* * * * *